3,330,747
METHOD OF PHOTOCHEMICALLY DECOLORIZING TRIALLYLISOCYANURATE
George R. Muller, Hopewell, and William P. Moore, Chester, Va., assignors to Allied Chemical Corporation, New York, N.Y., a corporation of New York
No Drawing. Filed Jan. 24, 1963, Ser. No. 253,747
11 Claims. (Cl. 204—158)

This invention relates to a method of decolorizing triallylisocyanurate, that is, to a method for converting off-color triallylisocyanurate to triallylisocyanurate having little or no color to the naked eye. In its most specific aspect, it relates to a method of substantially completely decolorizing off-color triallylisocyanurate.

Triallylisocyanurate is a chemical compound having utility as an intermediate for the manufacture of resins. Thus upon polymerization, for example by warming it with a small catalytic amount of benzoyl peroxide, it is converted to a hard, clear resin. Owing to the clarity of the resulting triallylisocyanurate polymer and the tenacity with which it adheres to glass, an important use for which it is particularly adapted is as a bonding agent for glass sheets in the formation of glass laminates useful as window panes, safety glass, and the like.

A number of processes are known for the manufacture of triallylisocyanurate. Thus, its manufacture by the interaction of cyanuric acid and allyl chloride is described in U.S. Patent 2,894,950 of July 14, 1959 to Billy E. Lloyd and Fred L. Kelly, and U.S. Patent No. 3,065,231 of Nov. 20, 1962 to Thomas C. Frazier, Jr. and Bernard H. Sherman.

Triallylisocyanurate in pure form is a colorless liquid under ordinary conditions (it melts at about 23° C.). As obtained commercially, however, it contains very small amounts of impurities which impart an off-color to it and which are carried over into the resins produced from it, causing them to be discolored. This discoloration is particularly objectionable in the case of triallylisocyanurate polymers employed in the manufacture of glass laminates to be used as window glass and safety glass.

Various methods are known for purifying triallylisocyanurate. Thus, it may be purified by vacuum distillation, by flash evaporation of volatile impurities, by crystallization from solvents at temperatures below its melting point, by washing with dilute aqueous ammonia, and by treatment with activated charcoal or other decolorizing carbons. While an improvement in the color or badly discolored triallylisocyanurate is sometimes obtained by such procedures, they normally do not reduce the color of the triallylisocyanurate to a very low level; the product still contains sufficient discolorization to be objectionable for use in making substantially water-white glass laminates.

An object of the present invention is to provide a method of producing triallylisocyanurate having little or no color from off-color triallylisocyanurate.

A further object of the invention is to provide a method of decolorizing discolored triallylisocyanurate whereby substantially water-white triallylisocyanurate can be obtained.

An additional object of the invention is to provide a method for reducing the color of triallylisocyanurate to a value not substantially above 5, as determined by comparison with American Public Health Association color standards (hereinafter referred to as "APHA color").

Other objects of the invention in part will be obvious and in part will appear hereinafter.

According to the present invention, off-color triallylisocyanurate, such as commercial triallylisocyanurate referred to above, is subjected to irradiation with light having a wave length within the range 2,000–6,000 A. (Angstrom units) for a period of time sufficient to effect a substantial reduction or improvement in the color of the triallylisocyanurate.

We have discovered that light of such wave lengths, and especially sunlight and ultraviolet light, exerts a decolorizing effect upon the colored impurities present in such triallylisocyanurate, thereby making it possible to reduce substantially the color of off-color triallylisocyanurate. Thus, by means of our invention the color of off-color triallylisocyanurate is reduced by at least APHA 10 and, in some cases (for example, where the APHA color is about 35–50), triallylisocyanurate is rendered substantially colorless to the naked eye.

We have further discovered that irridation of triallylisocyanurate in accordance with the present invention has no adverse effect on the physical and chemical properties of triallylisocyanurate itself; thus, the irradiation treatment does not interfere with the polymerization of the irradiated product.

The irradiation is carried out with the triallylisocyanurate in the liquid phase and preferably at a temperature not exceeding 60° C.; since maintenance of commercial triallylisocyanurate at temperatures above 60° C. for prolonged periods of time may lead to increased discoloration. An excellent light source is direct sunlight. Ultraviolet light ranging in wave length from about 2,000 to about 4,000 A. is also particularly suitable for the irradiation.

The period of time required to effect a desired improvement in color will vary with the degree of discoloration and the intensity of the radiation. In general the thickness of the layer of triallylisocyanurate is less critical than the time of exposure, provided it is not so great as to prevent the light from penetrating the triallylisocyanurate. Thus, two samples of the same triallylisocyanurate, one of which was in a layer 2 inches thick and the other of which was in a layer 12 inches thick, required the same period of exposure to direct sunlight (simultaneously) in order to decolorize them to the same extent.

In the preferred practice of the present invention, commercial triallylisocyanurate is irradiated in the liquid phase and at a temperature of about 23° to about 55° C., and preferably about 23° to about 35° C., for a period of time sufficient to effect a substantial reduction in the color of the isocyanurate. Using this procedure, triallylisocyanurate having a APHA color not exceeding 5 can be produced from triallylisocyanurate which has an APHA color of about 35–50. For example, about 80% of the color of a commercial triallylisocyanurate having an APHA color in the neighborhood of 35 can be removed by exposing it to direct sunlight for 10 hours under said preferred conditions.

If the triallylisocyanurate is highly discolored, such as crude commercial triallylisocyanurate, it is preferably subjected to one or more of the above purification treatments prior to the irradiation.

Preferably the highly discolored triallylisocyanate is subjected to preliminary treatment in the liquid phase with a decolorizing carbon, such as bone black or an activated charcoal, preferably at a temperature below 60° C., to effect a partial reduction in the color, prior to the irradiation treatment. For example, in this manner it is possible to reduce the color from about APHA 50 to about APHA 35.

When the triallylisocyanurate is very highly discolored, it is preferable to subject it to an additional purification by crystallization in the solid form (at a temperature below 23° C.) from a suitable solvent, for example an alcoholic or hydrocarbon liquid solvent, a number of which are known.

In this manner it is possible to obtain substantially water-white triallylisocyanurate from off-color triallylisocyanurate of various degrees of discoloration, without interfering with the ability of the isocyanurate to polymerize to a hard, clear resin, thereby increasing its utility for the manufacture of window laminates as well as for other resin uses where color is a disadvantage.

The invention will be illustrated by the following specific examples, but it is to be understood that the invention is not limited to their details and that changes may be made without departing from its scope. The temperatures are in degrees centigrade and the parts and percentages are by weight.

*Example 1*

Part 1.—A 50-gallon reactor was charged with 231.3 pounds of water, 19.04 pounds of solid sodium hydroxide, 20.0 pounds of cyanuric acid, and 0.15 pound of solid cuprous chloride. The reactor consisted of a water-cooled jacketed, glass-lined steel kettle, fitted with Hastelloy C baffles, a Hastelloy C turbine agitator rotating at 800 r.p.m., a Hastelloy C reflux condenser, a probe for continuously monitoring pH, and feed lines for allyl chloride and aqueous sodium hydroxide. The mixture was heated to 45°, and the addition of allyl chloride was started. Allyl chloride was added as fast as the heat of reaction could be removed. When the pH of the solution was decreased to 9, the addition of 50% aqueous sodium hydroxide was started and regulated to maintain the pH of the solution between 9 and 9.3. Addition of allyl chloride and sodium hydroxide in this manner was continued until a total of 72.84 pounds of allyl chloride and 7.78 pounds of sodium hydroxide (dry basis) were added (2 hours). Average pH during the reaction time was 9.2. Excess allyl chloride was then removed by distillation, the residue was agitated with 60 pounds of benzene, the resulting mixture was allowed to stratify, and the water layer was drawn off. It contained salt, by-product diallylisocyanurate, cuprous chloride and small amounts of unidentified impurities. The remaining benzene extract of triallylisocyanurate product was washed with 10 pounds of 10% aqueous ammonium hydroxide, then with 10 pounds of 10% aqueous sulfuric acid, and finally with 50 pounds of water. The resulting crude triallylisocyanurate which weighed 31.24 pounds was a yellow liquid. When compared with APHA color standards, it had a color greater than APHA 200.

Part 2.—The crude triallylisocyanurate thus obtained was dissolved in methanol at 40°, using 2 parts of methanol per part of triallylisocyanurate. The solution was cooled to −25°, and the resulting crystalline triallylisocyanurate was recovered by centrifugation and allowed to melt at room temperature. It formed a liquid having an APHA color of 50. This liquid product was pumped through a bed of activated charcoal at 40°, which treatment reduced the color of the liquid triallylisocyanurate to APHA 35.

Part 3.—The liquid product of Part 2 of this example was placed in glass containers which were sealed and allowed to stand in direct sunlight for 10 hours at 25°. The resulting liquid product appeared to be colorless when viewed with the eye, and gave an APHA color reading of 5. It was easily polymerized to a clear, hard colorless resin by the addition of a trace of benzoyl peroxide.

*Example 2*

Crude liquid triallylisocyanurate as obtained by synthesis in the manner set out in U.S. Patent 3,065,231 and having an APHA color of 90, was subjected to irradiation by direct sunlight at the ambient temperature without any preliminary purification. After exposure for 10 hours, the APHA color was 80 (a color reduction of 11%). After 30 hours' exposure the APHA color was 45 (a color reduction of 50%). Exposure for additional time removed still more color but at a slower rate.

*Example 3*

Triallylisocyanurate which had been obtained by synthesis from cyanuric acid and allyl chloride in the presence of aqueous sodium hydroxide, and which had an APHA color of 110, was irradiated in liquid form at the ambient temperature with ultraviolet light in the following manner, without subjecting it to a preliminary decolorizing purification treatment. A beaker was partially filled, to a depth of 2 inches with the triallylisocyanurate which was then irradiated with ultraviolet rays from an ultraviolet lamp (3660 A.), having an output of about 11 watts in the ultraviolet range, placed 3½ inches above the surface of the liquid in the beaker. After one day's (24 hours') exposure to the ultraviolet light, the sample had an APHA color of 75 (32% color reduction). After 5 days' exposure, the APHA color was 55 (50% color reduction). At this point the color reduction rate had decreased considerably.

It will be realized by those skilled in the art that changes can be made in the above examples without departing from the scope of the invention.

Thus, the invention is not limited to triallylisocyanurate produced as described in Example 1, Part 1. Similar results are obtained by employing in the processes of the above examples triallylisocyanurate (1) produced in the absence of a copper catalyst and (2) produced by other procedures from other starting materials.

We claim:

1. A method of decolorizing triallylisocyanurate having an APHA color greater than 35, said triallylisocyanurate having been obtained by reaction of cyanuric acid and allyl chloride in the presence of caustic alkali which comprises:
   (a) contacting said triallylisocyanurate in the liquid phase and at a temperature not exceeding 60° C. with a decolorizing carbon,
   (b) separating the resulting triallylisocyanurate from the carbon, whereby triallylisocyanurate having an APHA color less than 35 is obtained, and
   (c) irradiating said triallylisocyanurate in the liquid phase and at a temperature of about 23° to about 35° C. with ultraviolet light having a wave length within the range 2,000 to 4,000 A. until the irradiated triallylisocyanurate has an APHA color not exceeding 5.

2. A method of decolorizing triallylisocyanurate having a color greater than APHA 35, said triallylisocyanurate having been obtained by reaction of cyanuric acid and allyl chloride in the presence of caustic alkali which comprises irradiating said triallylisocyanurate, in the liquid phase at a temperature not exceeding 60°, with ultraviolet light containing radiation of a wave length within a range of 2,000 to 6,000 A. for a period of time sufficient to reduce the color of said triallylisocyanurate by at least APHA 10.

3. A method of decolorizing triallylisocyanurate having an APHA color of 35 to 50, said triallylisocyanurate having been obtained by reaction of cyanuric acid and allyl chloride in the presence of caustic alkali which comprises irradiating said triallylisocyanurate in the liquid phase and at a temperature of about 23° to about 35° C. with ultraviolet light containing radiation of a wave length within the range 2,000 to 6,000 A., for a period of time sufficient to render the irradiated triallylisocyanurate substantially colorless.

4. A method as defined in claim 3 wherein the triallylisocyanurate is irradiated with direct sunlight until the irradiated triallylisocyanurate has an APHA color not exceeding 5.

5. A method as defined in claim 3 wherein the triallylisocyanurate is irradiated with ultraviolet light ranging in wave length from 2,000 to 4,000 A. until the irradiated triallylisocyanurate has an APHA color not exceeding 5.

6. A method of improving the color of triallylisocyanurate having an APHA color greater than 50, said triallylisocyanurate having been obtained by reaction of cyanuric acid and allyl chloride in the presence of caustic alkali, which comprises:

(a) contacting said triallylisocyanurate in the liquid phase and at a temperature not exceeding 60° C. with a decolorizing carbon,
(b) separating the resulting triallylisocyanurate from the carbon, and
(c) subjecting the resulting triallylisocyanurate in the liquid phase to irradiation with ultraviolet light containing radiation of wave length within a range of 2,000 to 6,000 A. for a period of time sufficient to reduce its color by at least APHA 10.

7. A method of decolorizing triallylisocyanurate having an APHA color greater than 50, said triallylisocyanurate having been obtained by reaction of cyanuric acid and allyl chloride in the presence of caustic alkali, which comprises:
(a) contacting said triallylisocyanurate in the liquid phase and at a temperature not exceeding 60° C. with a decolorizing carbon,
(b) separating the resulting triallylisocyanurate from the carbon, and
(c) irradiating said triallylisocyanurate, in the liquid phase at a temperature not exceeding 60° C., with ultraviolet light containing radiation of wave length within a range of 2,000 to 6,000 A. for a period of time sufficient to render the irradiated triallylisocyanurate substantially colorless.

8. A method as defined in claim 7 wherein the light is ultraviolet light having a wave length within the range 2,000–4,000 A.

9. A method of decolorizing triallylisocyanurate having an APHA color greater than 35, said triallylisocyanurate having been obtained by reaction of cyanuric acid and allyl chloride in the process of caustic alkali, which comprises:
(a) contacting said triallylisocyanurate in the liquid phase and at a temperature not exceeding 60° C. with a decolorizing carbon,
(b) separating the resulting triallylisocyanurate from the carbon, whereby triallylisocyanurate having an APHA color less than 35 is obtained, and
(c) irradiating said triallylisocyanurate in the liquid phase and at a temperature of about 23° to 35° C. with ultraviolet light containing radiation of wave length within the range 2,000 to 6,000 A. until the irradiated triallylisocyanurate has an APHA color not exceeding 5.

10. A method for improving the color of triallylisocyanurate containing impurities incident to its manufacture, said triallylisocyanurate having been obtained by reaction of cyanuric acid and allyl chloride in the presence of caustic alkali which comprises irradiating said triallylisocyanurate in the liquid phase with ultraviolet light containing radiation of wave length within a range of 2,000 to 6,000 A. for a period of time sufficient to effect a reduction in the color of the triallylisocyanurate by at least APHA 10.

11. A method as defined in claim 10 wherein said triallylisocyanurate is irradiated with direct sunlight for a period of at least about 10 hours.

References Cited
UNITED STATES PATENTS

| | | | |
|---|---|---|---|
| 2,647,868 | 8/1953 | Dean | 204—158 |
| 2,799,639 | 7/1957 | Huston | 204—158 |
| 2,894,950 | 7/1959 | Lloyd et al. | 260—248 |
| 3,065,231 | 11/1962 | Frazier et al. | 260—248 |

JOHN H. MACK, *Primary Examiner.*

H. S. WILLIAMS, *Assistant Examiner.*